T. G. MARTIN.

TELEPHONE EXCHANGE SYSTEM.

APPLICATION FILED JULY 13, 1917.

Reissued Apr. 23, 1918.

14,462.

3 SHEETS—SHEET 1.

Inventor
Talbot G. Martin
By E. D. Fales
Attorney

T. G. MARTIN.

TELEPHONE EXCHANGE SYSTEM.

APPLICATION FILED JULY 13, 1917.

Reissued Apr. 23, 1918.

14,462.

3 SHEETS—SHEET 2.

Inventor
Talbot G. Martin
By E. D. Fales
Attorney

T. G. MARTIN.

TELEPHONE EXCHANGE SYSTEM.

APPLICATION FILED JULY 13, 1917.

Reissued Apr. 23, 1918.

14,462.

3 SHEETS—SHEET 3.

Inventor
Talbot G. Martin
By E. D. Fales.
Attorney

UNITED STATES PATENT OFFICE.

TALBOT G. MARTIN, OF CHICAGO, ILLINOIS, ASSIGNOR, BY MESNE ASSIGNMENTS, TO AUTOMATIC ELECTRIC COMPANY, OF CHICAGO, ILLINOIS, A CORPORATION OF ILLINOIS.

TELEPHONE-EXCHANGE SYSTEM.

14,462. Specification of Reissued Letters Patent. Reissued Apr. 23, 1918.

Original No. 1,176,715, dated March 21, 1916, Serial No. 331,022, filed August 17, 1906. Application for reissue filed July 13, 1917. Serial No. 180,443.

*To all whom it may concern:*

Be it known that I, TALBOT G. MARTIN, a citizen of the United States of America, and resident of Chicago, Cook county, Illinois, have invented a certain new and useful Improvement in Telephone-Exchange Systems, of which the following is a specification.

My invention relates to automatic or semi-automatic telephone systems in which the system is divided into districts—that is to say, in which the subscribers' telephone lines are divided into groups, and in which the lines of each group terminate at sub-central or outlying stations connected by trunk lines with a main or central trunking station. My invention also relates more especially to district telephone systems of this character in which the automatic selection of an idle trunk line running from the sub-central station to the main or central station is accomplished by momentarily grounding the calling telephone line.

Generally stated the object of my invention is the provision of an improved and highly efficient telephone exchange system.

Special objects of my invention are the provision of means by which the attendant at the main or central station of a district system of this character may have supervision and control over the automatic trunking apparatus at the sub-central or outlying trunking stations; the provision of means by which an attendant at the main or central trunking station may release or restore to normal condition any portion of the automatic trunking machinery at any sub-central or outlying trunking station; the provision of means for enabling the attendant at the main or central trunking station to know when a ground is accidentally established on any subscriber's line running to any one of the sub-central or outlying trunking stations, and to then restore the automatic switch or switching machinery which was operated at the sub-central station by the accidental grounding of the subscriber's line; the provision of means for enabling the attendant at the main or central trunking station to disconnect any subscriber's line from a trunk line, whenever such connection is brought about by the accidental grounding of the subscriber's line, and for thus preventing the accidental grounding of telephone lines from putting a corresponding number of trunk lines temporarily out of service, which latter would, of course, be the case were it not the fact that the attendant at the main or central trunking station can immediately, and whenever he discovers such an abnormal condition, promptly release the off-normal switch or switches at the sub-central station or stations; the provision of a releasing trunk between each sub-central station and the main or central trunking station, together with releasing switches located at the sub-central stations and selectively controlled from the central station of the said releasing trunks, whereby it is possible for an attendant at the main or central station to release or restore any trunking connection which may have been established by the accidental and temporary grounding of a subscriber's telephone line, thus making it unnecessary to send a "trouble man" to the sub-central stations to restore the off-normal switches; and the provision of certain details and features of improvement and combinations tending to increase the general efficiency and improve the service of a telephone exchange system of this particular character.

To the foregoing and other useful ends, my invention consists in matters hereinafter set forth and claimed.

Figures 1 and 2 together represent an established connection between the subscriber #500 of one sub-central office in the district system and the subscriber #220 of a second sub-central office in the same district system, said system involving the principles of my invention. The line of the subscriber #500 (Fig. 1) terminates in the line switch A of the five-hundred sub-central, which line switch, like all the switching apparatus in the system, is controlled by means of current from the battery B located at the main trunking station and from which battery leads run to the various sub-central stations. The said line switch A is adapted to select any one of a number of local trunk lines and is shown temporarily connected with the trunk line that leads to the repeater C, from which repeater a sub-central or incoming trunk line leads to the main trunking office and there terminates in the first-selector D. The said first-selector D is adapted to select any one of a number of local trunk lines and is shown as having selected one leading to the repeater $C^1$ (Fig. 2). From the said repeater $C^1$ a main trunking station or outgoing trunk line leads to the two-hundred sub-central and terminates in the connector E. The said connector E is also adapted to connect with any one of a number of subscribers' lines and is shown in connection with the line leading to the substation #220. Bridged across the called line is the line switch $A^1$ allotted to the said line. Each sub-central station has a group of line switches which is controlled by a master switch. One of said master switches is shown at F (Fig. 1) and as represented is allotted to the five-hundred sub-central. As previously stated, the current is supplied to the various central offices by battery leads from a central battery B; but provision is made for using the ground as a return, and preferably, therefore, the positive terminal of the battery B is grounded at G.

Figure 1:
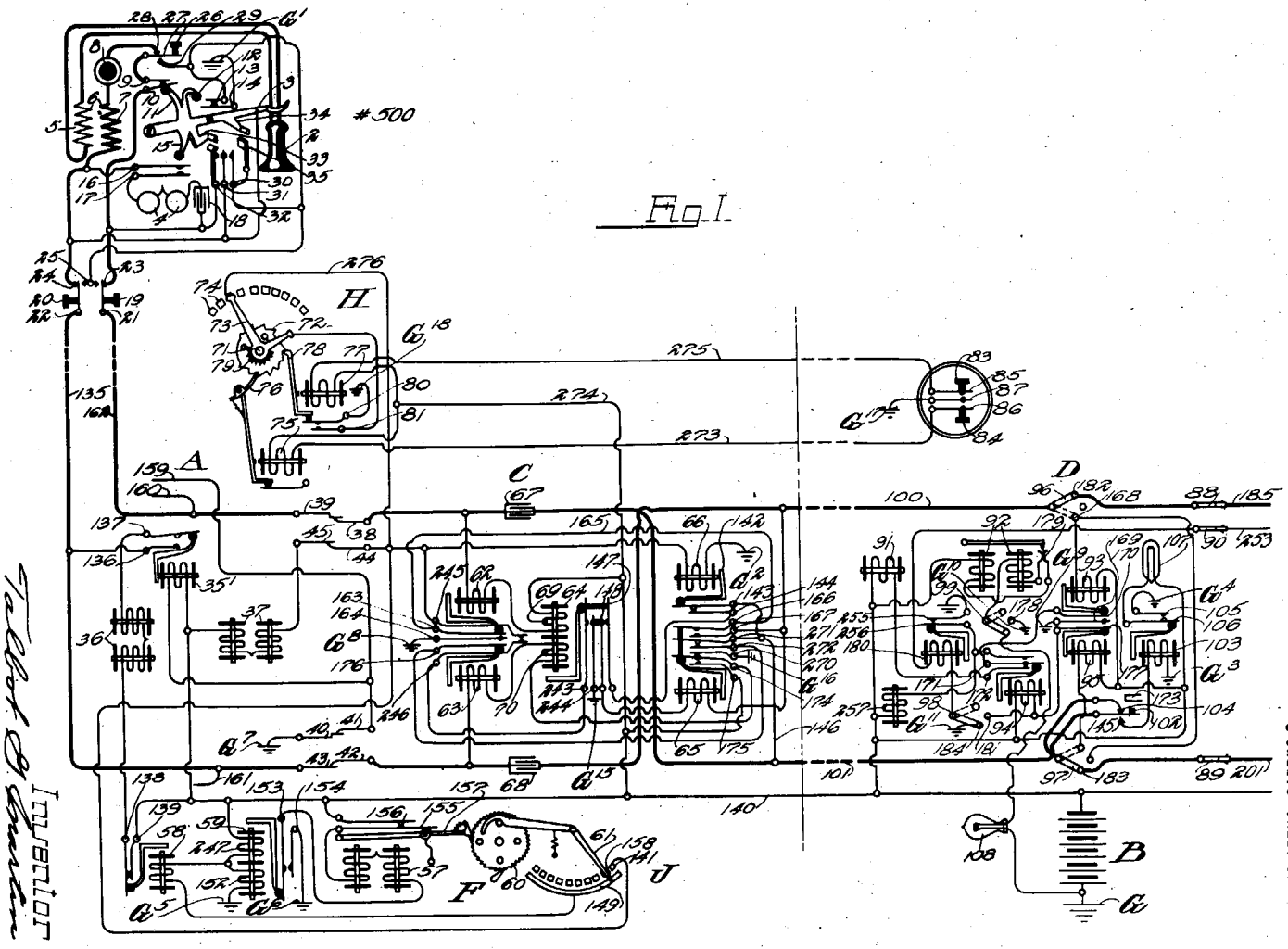

In Fig. 1 is shown the apparatus H by means of which the attendant at the main trunking office may release the line switch A if he should desire. Said apparatus is known as an auxiliary release switch.

The substation may be of any suitable or approved type. Said substation is equipped with means whereby the subscriber by removing has receiver 2 from the switch-hook 3 may disconnect his ringer 4 from its normal connection across the line, may close the primary circuit, and close the substation ground connection to certain points from which the necessary switching, signaling and releasing apparatus of the system may be controlled. More particularly the substation is of the common battery type in which the secondary circuit is a local permanently closed circuit comprising the said receiver 2 and secondary winding 5 of the induction-coil 6. The primary circuit, when the switch-hook is up, is in series with the line and comprises the primary winding 7, transmitter 8 and the primary circuit springs 9 and 10. The said springs 9 and 10 are controlled by the cam arm 11, so that when the switch-hook is down the said springs are separated and the primary circuit opened. The ground circuit is controlled by the cam arm 12 through the medium of the ground springs 13 and 14, and the ringer circuit is controlled by the cam arm 15, which latter controls the springs 16 and 17 that are included in series with the ringer 4 and condenser 18. The subscriber's calling device may also be of any suitable design, but as shown in Fig. 1, it comprises the switching impulse transmitting device comprising the push-buttons 19 and 20, the springs 21 and 22 controlled, respectively, by said buttons, the contact points 23 and 24 against which the said springs normally rest, and the ground post 25. After the connection is established the signaling is done by means of the signaling button 26 which is adapted, when pressed, to shift the spring 27 away from the contact point 28 and into engagement with the contact point 29. After a call has been made the switching apparatus may be restored by means of the release springs 30, 31 and 32 which are adapted to the pressed into contact at the same time by the cam arm 33. The preliminary impulse attachment comprises still another cam arm 34 and the ground spring 35, which latter the said cam arm is adapted to engage and through which a circuit is established with the rotary side of the subscriber's line.

Figures 3, 4:
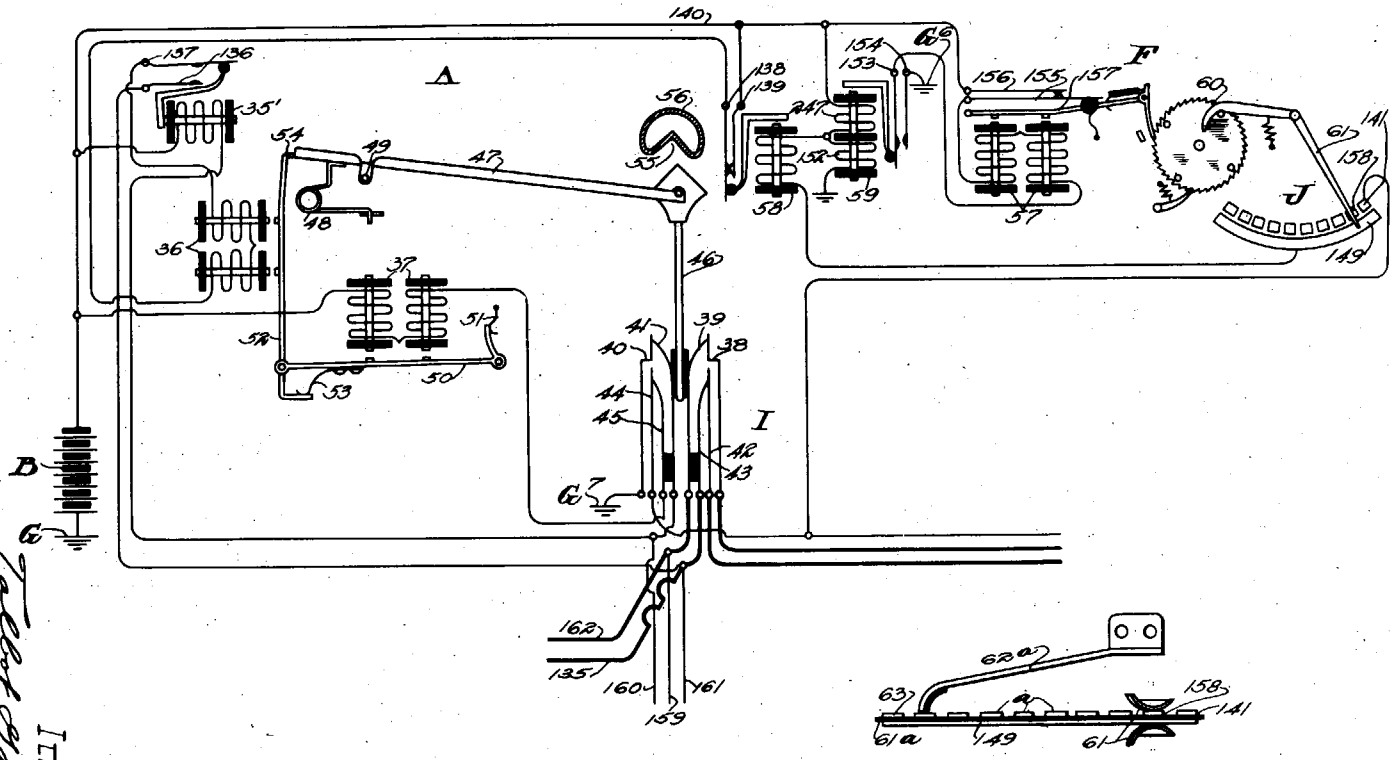
Fig. 3 shows more in detail the mechanical connection between the master switch and the line switch, and also shows more clearly the bank arrangement of the line switch.
Fig. 4 shows in detail the construction of the master switch bank J.

The line switch A may be of any suitable or approved type, such, for example, as the general type of line switch shown in British Patent No. 26,301 of 1906. Said line switch comprises, as shown in Fig. 3, the cutoff relay 35′, trip magnet 36, release magnet 37, and the bank I composed of a number of bank spring sets, only one set being illustrated, which set, furthermore, is shown shifted 90 degrees from its true position about an axis parallel with the springs and passing centrally through the set. The set, as shown, comprises the springs 38 and 39, 40 and 41, 42 and 43, and 44 and 45. For operating the bank springs the line switch is equipped with a plunger 46 pivotally mounted upon the plunger arm 47, which latter is subject to the rotative tension of an operating spring 48 about a pivot 49. The armature 50 of the release magnet 37 is normally controlled by a retracting spring 51. Said armature in turn carries on its end pivotally mounted the armature 52 of the trip magnet 36. Said armature 52 is normally controlled by the retracting spring 53. The end of said armature is provided with an angled section 54 adapted to so engage the plunger arm 47 that normally the plunger 46 is retained within the channel 55 of the plunger shaft 56, which latter is controlled by the master switch F. The individual switch as a whole operates in general as follows: When the subscriber removes his receiver from the switch-hook the trip magnet 36 is energized for a moment and the armature 52 is attracted in order that the catch 54 may disengage from the plunger arm 47; then the spring 48 rotates the plunger arm 47 about the pivot 49, thrusting the plunger 46 into the bank I. The plunger thus brought into use may be restored by a momentary energization of the release magnet 37, when the subscriber restores his receiver, which release magnet then attracts its armature 50, and raises the armature 52 of the trip magnet 36, so that the retracting spring 53 causes the end 54 to latch the plunger arm 47. When the release magnet 37 deënergizes, the retracting spring 51 then restores the plunger 46 to normal position within the slotted section 55 of the plunger shaft 56. When the plunger 46 is carried into engagement with the bank I, as described, a guarding potential is established at a proper contact of the bank J of the master switch F for operating the said master switch.

The master switch F comprises a motor magnet 57, an auxiliary relay 58 and a differential relay 59. The latter is adapted to control the energizing circuit of the motor magnet 57, while the said motor magnet in turn controls the ratchet wheel 60. As shown in Fig. 4, the master switch bank J comprises the individual contact points *a* separated from the common plate 149 by the insulating strip 61[a]. The insulated spring 62[a] is so arranged that when the wiper 61 engages the last contact point 63[a], and then on the next step is carried to the contact point 141 on the right, the upper part of the wiper 61 slides on the spring 62[a]. This provision is made in order that the wiper 61, in passing from the extreme left contact point 63[a] to the extreme right contact point 141, may not place the segments *a* in connection with the common member 149, whereby some interference might be experienced by the master switch. The energizing circuit for the differential relay 59 is in turn controlled by the wiper 61 that is also in engagement with the bank J, and whenever the said wiper 61 finds one of the bank contacts with a guarding potential the differential relay 59 is energized, which latter in turn energizes the motor magnet 57, carrying the wiper 61 to the next contact and incidentally rotating the plunger shaft 56 to carry all idle line switch plungers opposite the next idle trunk line in readiness to be seized by the next calling subscriber.

The repeater C comprises the vertical line relay 62, a rotary line relay 63, a differential relay 64, a pole changing relay 65 and an auxiliary relay 66. The main circuit that passes through said repeater is divided into two sections by the condensers 67 and 68. Normally the vertical line relay 62, in series with the winding 69 of the differential relay 64, and the rotary line relay 63, in series with the winding 70 of the differential relay 64, are bridged across the line in front of the said condensers 67 and 68. The auxiliary relay 66 is adapted to energize as soon as the line switch connects with the repeater C, so that a circuit is established through the first-selector D, whereby a lamp signal is set up at the said selector to indicate that the trunk leading thereto has been seized. Furthermore, said relay 66 bridges the pole changing relay 65 across the trunk line leading to the said selector D for purposes to be hereinafter described. The line relays 62 and 63 of the repeater are adapted to receive impulses from the substation over the circuit in front of the condensers 67 and 68, and to repeat the said impulses to the trunk line leading to the first-selector D over circuits behind the condensers 67 and 68. The differential relay 64 controls the trunk release circuit for the line switch A, and controls the energizing circuit of the pole changing relay 65.

The auxiliary release switch H is a similar mechanical device mounted upon any suitable base and comprises a rotatable switch shaft 71 provided with a number of longitudinal teeth 72 and a wiper 73. Said wiper is adapted to engage a set of bank contacts 74. The switch is provided with a rotary magnet 75, the armature of which is provided with a pawl 76 for rotating the shaft 71. Said pawl is retained normally out of engagement with the longitudinal teeth 72; but when the magnet 75 is energized said pawl then engages said teeth for rotating the shaft. In addition the switch has a release magnet 77 for controlling the pawl 78, which pawl retains the shaft in each advanced step. The shaft is given a normal tendency to rotate in a clockwise direction by a suitable spring 79, and, therefore, whenever the release magnet 77 is energized the said spring 79 returns the shaft to normal position. Said release magnet is provided with a couple of springs 80 and 81 which, when the release magnet is energized, are adapted to engage for connecting the wiper 73 with ground and, therefore, for grounding either of the bank contacts with which the said wiper may be in engagement.

The first selector D is of the general type described in Patent No. 815,321, granted March 13th, 1906, to Keith, Erickson and Erickson, and is provided with the usual shaft (not shown) that carries the line wipers 88 and 89 and the private wiper 90. The said shaft is adapted to move in a vertical and in a rotary direction, the vertical movement being effected by the so-called vertical magnet 91, and the rotary movement by the rotary magnet 92. The vertical magnet 91 is controlled by the vertical line relay 93, and the rotary magnet 92 by the private magnet 94, which latter is in turn controlled by the rotary line relay 95. The said line relays 93 and 95 are normally connected with the side switch wipers 96 and 97, respectively. The selector side switch comprises, in addition to the selector side switch wipers 96 and 97, the side switch wipers 98 and 99. Said wipers are adapted to be placed, as is well known, in any one of three positions known as the first, second and third positions of the side switch. As shown in Fig. 1, the vertical trunk line conductor 1— terminates in the side switch wiper 96 and the rotary trunk conductor 101 terminates, instead, in the switch shaft spring 102, which latter, when the switch is in normal position, is in connection with the supervisory relay 103, but when the switch shaft is raised it engages the contact point 104, which latter is connected to the rotary line relay 95. The said supervisory relay 103 when energized presses the springs 105 and 106 into contact, whereby the signal lamp 107 flashes up and indicates that the trunk leading to the switch D is in use. As soon as a line switch seizes upon the repeater C, therefore, the supervisory lamp 107 at the switch D lights; but as soon as the switch-shaft is raised the said light goes out, and when the side switch wiper 99 passes to third position another supervisory lamp 108 lights instead to indicate that a connection has been completed by the switch D.

The repeater $C^1$ is very much like the repeater C. There are certain differences, however, which will be pointed out. It is provided with vertical and rotary line relays 109 and 110, respectively, the differential relay 111 having two windings 112 and 113, and a pole changing relay 114. The circuit passing through the said repeater is divided into two sections by the condensers 115 and 116.

The connector E is of the general type described in Patent No. 815,176, granted March 13th, 1906, to Keith, Erickson and Erickson; the said connector, however, may be of any suitable or approved type. The mechanical details are very much the same as those of the selector D, but the circuits are quite different. The connector-switch shaft (not shown) carries the usual wipers 116′, 117 and 118. Said switch is controlled by the calling subscriber through the medium of the vertical and rotary line relays 119 and 120. The vertical line relay 119 controls, directly, the vertical magnet 121 and also the rotary magnet 122. The function of the said vertical magnet is to give the shaft and shaft wipers a vertical movement, and the rotary magnet 122 imparts to said shaft and wipers a rotary or circular motion. The rotary line relay 120 controls the private magnet 123, which latter controls the side switch. The side switch comprises, as is well known, the side switch wipers 124, 125, 126 and 127, which wipers are all rigidly connected and adapted to assume any one of three positions in the accomplishment of certain switching operations that are well known. The line relays 119 and 120 conjointly control the release magnet 128. Under certain conditions the said release magnet 128 is controlled by the private magnet 123. Like the repeater, the connector divides the circuit that passes through it into two sections by the condensers 129 and 130. The connector has, in addition, a ringer relay 131 by means of which the called subscriber's line is disconnected from the calling subscriber's line and bridged across the ringer generator 132 when the calling subscriber desires to signal the called subscriber. The system is also provided with a busy signaling machine K which may be of any suitable or approved design and may be located at any desired point (preferably at the main trunking station) and from which suitable leads may be extended to the various sub-central stations or other offices at which the connectors are located.

The line switch $A^1$ is the same as the line switch A and needs no further description, since throughout the drawings like parts are likewise represented.

The substation #220 is, of course, the same as the substation #500 which has been described.

The general operation of the system may be described as follows: If the subscriber #500 wishes to call the substation #220 he removes his receiver from the switch-hook, thereby sending a preliminary impulse to the line switch A, which latter operates to release the plunger, as already described, seizing an idle trunk line to the repeater C, assuming, of course, that the plunger is opposite the set of line bank springs that constitute the terminal of the repeater C. At that instant the master switch F is caused to operate to carry the plungers of all other idle line switches opposite the first idle trunk line. The seizure of the trunk line of the repeater C not only operates the master switch F, but the auxiliary relay 66 of the repeater C is also operated at the instant of seizure, establishing an energizing circuit through the supervisory relay 103 of the selector D, which relay in turn causes the lamp 107 to be lighted, as already described. The subscriber then operates the calling device for the digit 2, operating the vertical button 19 twice and the rotary button 20 once. The repeater C receives the said impulses and transmits similar impulses over the vertical and rotary trunk conductors 100 and 101 for operating the selector D. The impulses to the vertical trunk conductor 100 raise the shaft of the selector D to the second level, and the impulse to the rotary trunk conductor 101 then starts the said shaft on an automatic rotation for selecting an idle trunk line of that level, which object being accomplished the instrument then comes to a standstill. The seized trunk line, it is now assumed, leads to the repeater $C^1$. The subscriber then presses his vertical button 19 twice and the rotary button 20 once for the second digit. The impulses are then taken up by the repeater C, repeated to the trunk conductors 100 and 101, which repeated impulses are taken up by the repeater $C^1$ and repeated to the trunk conductors 133 and 134 for operating the connector E. The impulses to the vertical trunk conductor 133 operate to raise the connector-shaft to the second level and the impulse to the rotary trunk conductor 134 operates to send the connector side switch to second position. The subscriber then, for the digit 0 (which is the last), operates the vertical button 19 ten times and the rotary button 20 once. These impulses are taken up by the repeater C, repeated to the repeater $C^1$, and again repeated to the connector E, whereby the shaft of said connector is rotated ten steps into engagement with the terminals of the substation #220 by the impulses delivered to the vertical trunk conductor 133. The impulse delivered to the rotary trunk conductor 134, after the above has been accomplished, operates to do either of two things, namely to shift the side switch to third position and complete the connection, or to release the connector-switch E if the called line is busy. The subscriber presses his signaling button 26, which acts the same as pressing the vertical button 19. The said vertical impulse is transmitted to the repeater C, then to the repeater $C^1$, then to the connector E, which latter then operates to raise the connector-shaft, thus closing a circuit from the busy signaling machine K to the calling substation. In the former case—that is, if the connection is made—the impulse passes from the repeater C to the reepater $C^1$ and then to the connector E, whereby the ring relay 131 is energized for disconnecting the calling subscriber's line from the called subscriber's line, and for bridging the ringer generator 132 across the called subscriber's line. But in either case the calling subscriber eventually must restore his receiver to the switch-hook to restore the switching apparatus to its normal condition. He does so by hanging up his receiver 2 and grounding both sides of his line simultaneously for a moment. The ground impulses are received by the repeater C, which latter does two things—releases the line switch A, and repeats the impulses to the repeater $C^1$, said repeater $C^1$ releasing the first selector D and repeating the impulses to the connector E for releasing the said connector also.

The operation in detail is as follows: As stated, to call the number 220 the calling subscriber removes his receiver and sends a preliminary impulse for operating the line switch A. The preliminary impulse is transmitted when, as the switch-hook rises, the cam arm 34 engages the ground spring 35 after the ground springs 13 and 14 engage. As a result the trip magnet 36 is energized over a circuit that extends from ground $G^1$ at the substation, through the springs 14 and 13 to the preliminary impulse ground spring 35, thence to the cam arm 34, contact point 24, spring 22, rotary line conductor 135, cut-off relay springs 136 and 137 to the trip magnet 36, thence through said trip magnet and through the springs 138 and 139 of the auxiliary relay 58 to the battery lead 140, thence through battery B to ground G. It is assumed that the plunger 46 is at this time opposite the first set of bank springs of the bank I, and, therefore, that the master switch wiper 61 is resting on the first bank contact 141. This being the case, when the trip magnet 36 is energized the armature 52 is attracted and the plunger 46 driven into engagement with the first set of bank springs, as shown in Fig. 3; and as a result the springs 38 and 39 are brought into contact, also the springs 40 and 41, the springs 42 and 43, and the springs 44 and 45. The closure of connection between the springs 44 and 45 establishes a circuit through the auxiliary relay 66 of the repeater C, causing the said relay 66 to become energized, attracting its armature 142. The circuit over which the energizing current flows extends from ground $G^2$ through the coil 66 to the springs 44 and 45, release magnet 37 to the battery lead 140, thence through battery B to ground G. Although the circuit passes through the release magnet 37 the resistance of the coil 66 at the repeater C is sufficient to prevent the release magnet 37 from becoming operatively energized. As soon as the auxiliary relay 66 is operated the springs 143 and 144, under its control, are carried into engagement, and as a result an energizing circuit is established for the supervisory relay 103 of the selector D. The current for energizing said relay 103 flows from ground $G^3$ at the selector D, through the supervisory relay 103 to the contact point 145, switch shaft spring 102, rotary trunk conductor 101, conductor 146 of the repeater C, springs 143 and 144 of the auxiliary relay 66, springs 147 and 148 of the differential relay 64 and through the pole changing relay 65 to the vertical trunk conductor 100, thence through the vertical line relay 93 of the selector D to the battery lead 140, and through battery B to ground G. The energization of the supervisory relay 103 causes the closure of connection between the springs 105 and 106, whereby a flow of current is sent through the lamp 107 from ground $G^4$ through the said springs 105 and 106, the said lamp 107 and to the battery lead 140, thence through battery B to ground G. The main trunking office is, therefore, notified as soon as the selector D is seized by a switch at the #500 sub-central station. The current that energizes the supervisory relay 103, it has been shown, passes through the pole changing relay 65 and line relay 93, but the said supervisory relay is of sufficient resistance to cut down the current to such an extent that the pole changing relay 65 and line relay 93 do not become operatively energized. The closure of connection between said springs 44 and 45 not only accomplishes the energization of the auxiliary relay 66, but also establishes a guarding potential at the master switch bank contact 141 for driving the master switch into the next position. It has been assumed that the master switch wiper 61 is in engagement with the contact point 141, the said wiper being sufficiently long to always maintain connection with the common plate 149. The auxiliary relay 58 and the differential relay 59 of the master switch F are energized at the instant that the said guarding potential is established at the contact point 141. The circuit over which the said guarding potential is established is as follows: from the battery lead 140 to the release magnet 37 of the line switch A, thence through the springs 45 and 44 to the bank contact 141. Current then flows from the said contact through the wiper 61 to the common plate 149, thence through the auxiliary relay 58 and winding 152 of the differential relay 59 to the ground terminal $G^5$. Therefore, both the auxiliary relay 58 and the differential relay 59 become energized, the latter forcing the springs 153 and 154 into contact, setting up a circuit through the motor magnet 57. The current flows from ground $G^6$ through the springs 154 and 153, through the said motor magnet 57, and through the interrupter springs 155 and 156 to the battery lead 140, thence through battery B to ground G. The motor magnet 57 then attracts its armature 157, driving the ratchet wheel 60 to the next position. The said ratchet wheel controls the plunger shaft 56 and the master switch wiper 61. Therefore, the advance of the said ratchet wheel one step carries the master switch wiper 61 to the next position and into engagement with the bank contact 158, and also advances the plunger shaft 56, so that all the idle plungers are carried opposite the second set of bank springs, which, it is assumed, are connected to the next idle trunk line. If the said trunk line is not idle, however, there will also be a guarding potential at the master switch contact point 158, so that the energizing circuit through the differential relay 59 is still maintained, and the motor magnet 57 again operated to rotate the ratchet wheel 60 another step. As soon as the master switch wiper 61 finds a bank contact without a guarding potential the differential relay 59 becomes deënergized, the differential relay springs 153 and 154 separate, and the energizing circuit through the motor magnet 57 is permanently broken. It will be understood that the trip magnets 36 of all the line switches of the same group are connected to the spring 138 of the auxiliary relay 58, and therefore that when said relay becomes energized the connection is broken between all trip magnets 36 and the battery lead 140 to prevent another line switch from operating while the master switch F is in operation to carry all idle plungers to their proper positions—that is, opposite an idle trunk line. The engagement of the line switch bank springs 40 and 41 at the same time causes the energization of the cut-off magnet 35′ of the line switch A, which latter then operates to separate the springs 136 and 137 to prevent the trip magnet 36 from being uselessly energized when the subscriber proceeds to send further impulses from his substation. The energizing circuit for the said cut-off magnet 35′ extends from ground $G^7$ through the said springs 40 and 41 and through the cut-off magnet 35′ to the battery lead 140, thence through battery B to ground G. It will be noticed that the so-called private normal conductor 159 terminates in the spring 41 of the line switch A. Said conductor leads to the connector switch banks and terminates in contact points that correspond to the substation #500. When the springs 40 and 41 engage, a guarding potential is established from ground $G^7$ through the springs 40 and 41 and over the said private normal conductor 159 to the said connector banks, to prevent a calling subscriber from calling in on the subscriber #500 while the latter is calling. Along with the said private normal conductor 159 run the line normal conductors 160 and 161, over which the connection is made between the calling subscriber and the substation #500. When the springs 38 and 39 come into contact the subscriber's vertical line conductor 162 is extended to the repeater C, and when the springs 42 and 43 engage, the subscriber's rotary line conductor 135 is extended to the repeater C, so that the succeeding impulses sent from the substation #500 are all directed, first, to the repeater C.

The first digit being 2 the subscriber presses his vertical button 19 twice, grounds the vertical line conductor 162 and operates the vertical line relay 62 of the repeater C. The ground to the said vertical line conductor 162 is made when the vertical button 19 presses the spring onto the ground post 25, and the established circuit permits a current to flow from the ground $G^1$ at the substation to the ground post 25, thence to the spring 21 and through the vertical line conductor 162 through the line switch springs 39 and 38 to the vertical line relay 62, thence through the winding 69 of the differential relay 64 to the battery lead 140, thence through the battery B to ground G. Each time that the vertical line relay 62 is operated the line relay springs 163 and 164 are pressed into contact and the vertical trunk conductor 100 is grounded from the repeater ground $G^8$. The circuit over which this current is established extends from ground $G^8$ through the said springs 164 and 163, conductor 165, pole changing relay springs 166 and 167 to the vertical trunk conductor 100. Grounding the said vertical trunk conductor establishes an energizing circuit through the vertical line relay 93 of the selector D. The energizing current flows from the vertical trunk conductor 100 through the side switch wiper 96, contact point 168 to the vertical line relay 93, thence through the said relay to the battery lead 140 and through battery B to ground G. The said vertical line relay upon energizing presses the line relay springs 169 and 170 together, sending a flow of current from ground $G^9$ through the said springs 169 and 170 and through the private magnet springs 171 and 172 to the vertical magnet 91, thence to the battery lead 140 and through battery B to ground G. The said vertical magnet, as is well known, operates to raise the shaft and, therefore, the wipers 88, 89 and 90 one step at a time. Since the vertical button 19 is pressed twice the said shaft is raised two steps. The same current that energizes the vertical line relay 62 of the repeater C passes through the winding 69 of the differential relay 64, energizing said differential relay and causing the latter to separate the spring 147 from the spring 148. The object in separating the said springs is to destroy the circuit established between the vertical and rotary trunk conductors 100 and 101 when the auxiliary relay 66 energizes to prevent the impulses delivered to the vertical trunk conductor 100 from passing to the rotary trunk conductor 101. The passage of said impulses, were the said springs 147 and 148 to remain in contact, would take place through the pole changing relay 65, through the said differential relay springs 148 and 147, auxiliary relay springs 144 and 143 to the rotary trunk conductor 101. When the switch shaft of the first selector D is raised by the first operation of the vertical magnet 91, the normal post arm 173 of the said selector permits the switch shaft spring 102 to leave the contact point 145 and break the energizing circuit through the supervisory relay 103. Said supervisory relay in turn permits the springs 105 and 106 to separate and destroys the line signal at the lamp 107. The switch shaft spring 102 upon leaving the said contact 145 engages the contact point 104 and thus connects the rotary trunk conductor 101 with the side switch wiper 97, which wiper is normally in engagement with the rotary line relay 95. When the subscriber presses the rotary button 20 he presses the spring 22 onto the ground post 25 and thus grounds the rotary line conductor 135. As a result the rotary line relay 63 of the repeater C, as well as the differential relay 64, become energized. The energizing current flows from ground $G^1$ to the ground post 25, thence to the spring 22 and to the rotary line conductor 135, bank springs 43 and 42 of the line switch A to the rotary line relay 63 of the repeater C, thence through the winding 70 of the differential relay 64, through the pole changing relay springs 174 and 175 to the battery lead 140, thence through battery B to ground G. The energizing of the differential relay 64 separates the springs 147 and 148 for the purpose (already described) of separating the established connection between the trunk conductors 100 and 101. The rotary line relay 63 upon energizing presses the spring 176 onto the ground springs 164, thereby delivering a ground impulse to the rotary trunk conductor 101. The said impulse in turn operates the rotary line relay 95 of the first selector D. The current flows from the ground $G^8$ at the repeater C through the above traced circuit to the rotary trunk conductor 101, thence through the switch shaft springs 102 and 104 to the side switch wiper 97, thence through the rotary line relay 95 to the battery lead 140, and through battery B to ground G. The rotary line relay 95 in turn presses the spring 177 cnto the spring 169, as a result energizing the private magnet 94. The current through the said magnet flows from ground $G^9$ at the said selector through the springs 169 and 177 to the private magnet 94, thence through the said magnet to the battery lead and through battery B to ground G. The private magnet then operates to trip the side switch to second position, at which time the side switch wiper 99 engages the grounded contact point 178. A circuit is thus established from ground $G^{10}$ to the contact point 178, side switch wiper 99 to the rotary magnet 92, thence from said magnet and interrupter spring 179 to the battery lead 140, and through battery B to ground G. The said rotary magnet then rotates the shaft the first step, and after the private wiper 90 is driven into engagement with the grounded contact point the private magnet 94 is again energized by a flow of current from the said grounded contact point to the private wiper 90 through the back-release relay 180, side switch wiper 98, contact point 181, private magnet 94 to the battery lead 140, and thence through battery B to ground G. The said private magnet then locks the side switch in second position until the rotary magnet 92 carries the wipers beyond all busy trunk lines. The private magnet 94 then, of course, deënergizes, releasing the side switch to third position and breaking the energizing circuit for the rotary magnet 92 when the side switch wiper 99 leaves the contact point 178. As is well known, if there are no busy trunks to be passed over the rotary magnet 92, upon energizing the first time, operates the armature of the private magnet 94 and thus releases the side switch from second to third position. As soon as the side switch reaches the third position the side switch wipers 96 and 97 engage the contact points 182 and 183, so that the calling subscriber's extended line conductors 100 and 101 are still further extended to the repeater $C^1$. Furthermore, when the side switch wiper 98 engages the grounded contact point 184 a guarding potential is established at the private wiper 90 from ground $G^{11}$ for protecting the seized trunk line against interference. This circuit from said ground $G^{11}$ extends to the contact point 184, thence through the side switch wiper 98, back-release relay 180 to the private wiper 90. Another effect of the passage of the side switch to third position is the lighting of the supervisory lamp 108. The circuit over which the said lamp is energized, as shown, extends from the ground terminal G of battery B through the said lamp and through the side switch wiper 99 (when the latter is in third position) to the rotary magnet 92, thence through the said magnet to the battery lead 140, and through battery B to ground G. The resistance of the said lamp 108 is sufficient to prevent the flow of current from becoming strong enough to operatively energize the rotary magnet 92.

The second digit of the desired number being 2 the vertical button 19 is again pressed twice and the rotary button 20 once. When the vertical button 19 is pressed twice the vertical line conductor 162 is again grounded twice and the vertical line relay 62 of the repeater C correspondingly operated. Said relay in turn repeats the impulses to the vertical trunk conductor 100, which impulses are directed to the repeater $C^1$ for operating the vertical line relay 109 of said repeater and also the differential relay 111. The energizing circuit for operating said relays at the repeater $C^1$ flows from ground $G^8$ at the repeater C, as already described, to the vertical trunk conductor 100, thence through the side switch wiper 96 of the first selector D, contact point 182, vertical line wiper 88, vertical trunk conductor 185 to the vertical line relay 109 (Fig. 2), thence through the said relay and through the winding 112 of the differential relay 111 to the battery lead 140, thence through battery B to ground G. The vertical line relay 109 upon operating presses the springs 186 and 187 into contact, whereby the impulses received by the vertical line relay 109 are repeated to the vertical trunk conductor 133. The circuit over which the impulses are delivered extends from ground $G^{12}$ through the pole changing relay springs 188 and 189, conductor 190 to the spring 186, and thence to the spring 187, conductor 191 and vertical trunk conductor 133. The said ground impulses are directed to the connector E for operating the vertical line relay 119 of said connector. The impulses continue from the vertical trunk conductor 133 through the vertical line relay 119 of the connector, winding 192 of the differential relay 193 to the battery lead 140, thence through battery B to ground G. The said vertical line relay, each time it is energized, presses the springs 194 and 195 into contact and energizes the vertical magnet 121 for operating the connector switch shaft one step at a time. The energizing circuit extends from ground $G^{13}$ through the said springs 194 and 195, private springs 196 and 197, side switch wiper 127, contact point 198, vertical magnet 121 to the battery lead 140, thence through battery B to ground G. The differential relay 111 of the repeater $C^1$, like the differential relay 64 of the repeater C, energizes in series with the vertical line relay 109 and separates the springs 199 and 200 for destroying the normal circuit (through the pole changing relay 114) that exists between the rotary and vertical trunk conductors 133 and 134, as shown, thus preventing the transfer of impulses from one of said trunk conductors to the other. When the subscriber presses his rotary button 20 he energizes the rotary line relay of the repeater C, which latter then presses the springs 176 and 164 together, sending an impulse to the rotary trunk conductor 101 over circuits already described. The said impulse is then directed to the repeater $C^1$ (Fig. 2) for energizing the rotary line relay 110. The energizing circuit for said rotary line relay 110 is established from ground $G^8$ at the repeater C to the rotary trunk conductor 101, thence through the switch shaft springs 102 and 104 of the first selector D, side switch wiper 97, contact point 183, rotary line wiper 89, rotary trunk conductor 201, rotary line relay 110 of the repeater $C^1$ (Fig. 2), winding 113 of the differential relay 111 pole changing relay springs 202 and 203 of the pole changing relay 114 to the battery lead 140 thence through battery B to ground G. It will be noticed that the energizing circuit includes the differential relay 111, which relay is energized by the impulses to the vertical or rotary trunk conductors 100 and 101 for separating the springs 200 and 199 to prevent the transfer of impulses from the rotary trunk conductor 134 to the vertical trunk conductor 133. The rotary line relay 110 when operated as above explained, presses the spring 204 onto the springs 186 and sends a ground impulse to the rotary trunk conductor 134 for operating the rotary line relay 120 of the conductor E. The circuit through said rotary line relay 120 is established from ground $G^{12}$ at the repeater $C^1$ through the pole changing relay springs 188 and 189, line relay springs 186 and 204, conductor 205, pole changing relay springs 207 and 206 to the rotary conductor trunk 134, rotary line relay 120, winding 208 of the differential relay 193, through the back-bridge relay springs 209 and 210 to the battery lead 140, thence through battery B to ground G. The rotary line relay 120 on becoming energized presses the line relay spring 211 onto the ground spring 194, energizing the private magnet 123. The energizing current flows through the springs 194 and 211, through the private magnet 123, thence through the back-bridge relay springs 209 and 210 to the battery lead 140, thence through battery B to ground G. The private magnet 123 when operated releases the side switch of the connector from first to second position. The side switch wiper 127, therefore, engages the contact point 212, and the side switch wiper 126 engages the contact point 213. The shifting of the side switch wiper 127 onto the contact point 212 substitutes the rotary magnet 122 for the vertical magnet 121, bringing the former under the control of the vertical line relay 119. It will be understood that the differential relay 193 is energized each time that the vertical or rotary line relays are energized, being in the same energizing circuit; but the energization of said differential relay is of no consequence at this stage.

Figure 2:
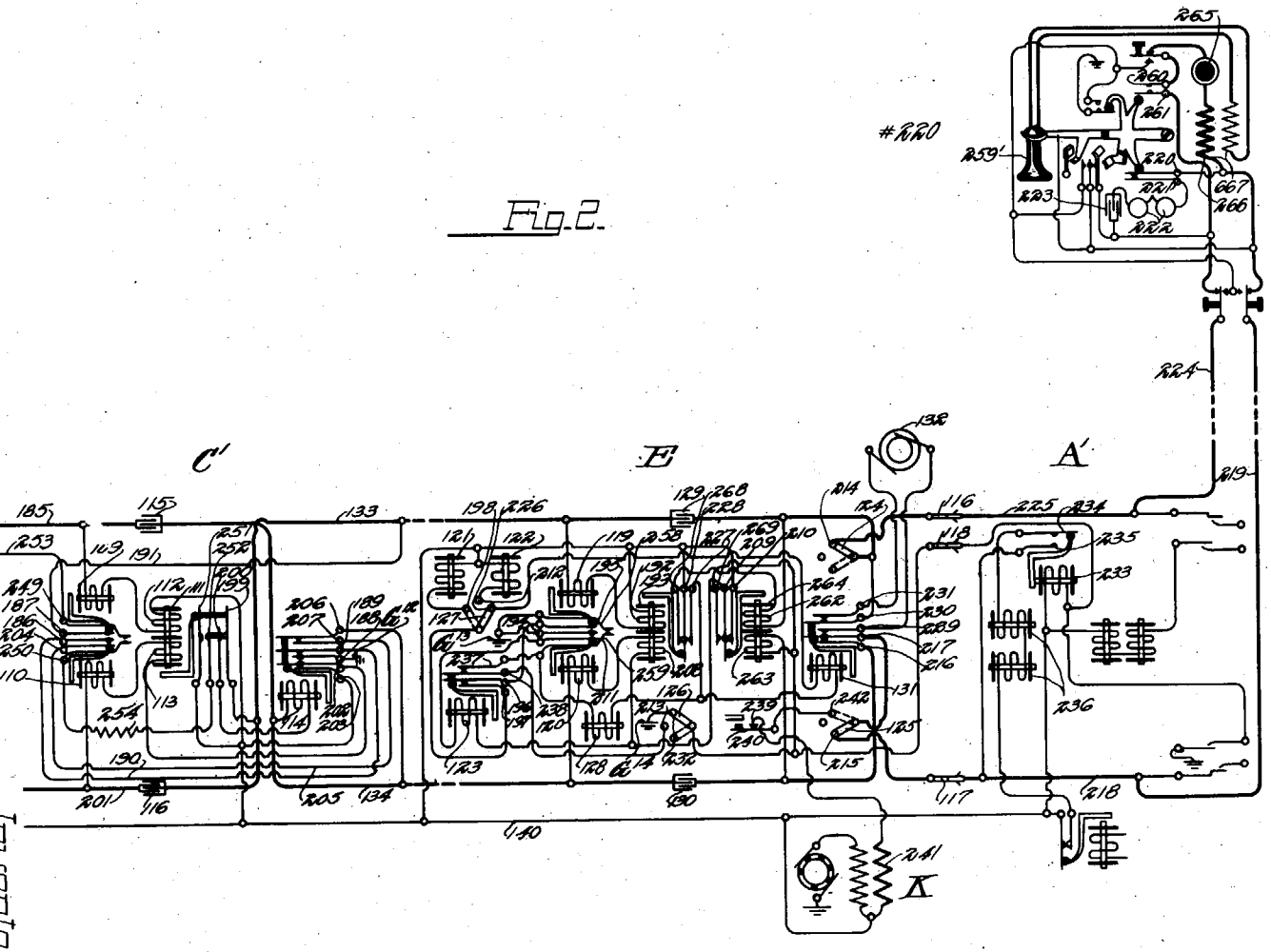

The third digit being 0 the subscriber presses the vertical button 19 ten times, then the rotary button 20 once. Pressing the vertical button 19 ten times grounds the vertical line conductor 162 ten times. The impulses are received by the vertical line relay 62 of the repeater C and repeated to the vertical trunk conductor 100 and in turn received by the vertical line relay 109 of the repeater $C^1$. Said vertical line relay repeats them again to the vertical trunk conductor 133 for operating the vertical line relay 119 of the connector E. Said vertical line relay becomes energized at each impulse, as already described, as a result causing the spring 195 to be pressed against the spring 194. Each time that the engagement of said springs occurs the rotary magnet 122 is energized by a flow of current from ground $G^{13}$ at the connector E through the said springs 194 and 195, private springs 196 and 197 to the side switch wiper 127, thence through the rotary magnet 122 to the battery lead 140, and through battery B to ground G. The rotary magnet 122 is thus energized ten times and the connector-shaft and wipers rotated ten steps along the second level and into engagement with the terminals of the substation #220. When the calling subscriber presses his rotary button 20 he grounds the rotary conductor 135 and operates the rotary line relay 63 of the repeater C. Said rotary line relay in turn repeats the impulse to the rotary trunk conductor 101, operating the rotary line relay 110 of the repeater $C^1$, said rotary line relay in turn operating to energize the rotary line relay 120 of the connector E. The energization of said rotary line relay 120 of the connector E produces the energization of the private magnet 123 of the connector over circuits that are already known. Said private magnet upon being operated causes either of two operations, namely the release of the connector-switch E if the called line is busy, or the release of the connector side switch to third position if the line is not busy, whereby the calling subscriber's line is connected with the called subscriber's line over circuits indicated by the heavy conductors (Figs. 1 and 2). It will be assumed, first, that the operation of the private magnet produces the latter result—that is, releases the connector side switch to third position. When the side switch passes to third position the side switch wipers 124 and 125 pass into engagement with the contact points 214 and 215, thus completing the connection between the two subscribers' lines, as already stated. The connection may be traced as follows: Beginning with the subscriber's transmitter 8 at the substation #500 it extends through the primary winding 7 of the induction-coil 6 to the rotary line conductor 135, thence through the line switch bank springs 43 and 42 to the condenser 68 of the repeater C to the vertical trunk conductor 100, side switch wiper 96 of the selector D, contact point 182, vertical line wiper 88, vertical trunk conductor 185, condenser 115 of the repeater $C^1$ (Fig. 2), rotary line conductor 134 to the condenser 130 of the connector E, ringer relay springs 216 and 217, side switch wiper 125, contact point 215, rotary line wiper 117, rotary normal conductor 218, rotary line conductor 219, ringer springs 220 and 221, ringer 222, condenser 223, vertical line conductor 224, vertical normal conductor 225, vertical line wiper 116′, contact point 214, side switch wiper 124, condenser 129, vertical trunk conductor 133, condenser 116 of the repeater $C^1$, rotary trunk conductor 201, rotary line wiper 89, contact point 183 of the first-selector D, side switch wiper 97, switch shaft springs 104 and 102, rotary trunk conductor 101, condenser 67 of the repeater C, springs 38 and 39 of the line switch A, vertical line conductor 162, spring 21, contact point 23, springs 10 and 9 to the transmitter 8.

To signal after the connection is established the calling subscriber presses his signaling button 26 and grounds the vertical line conductor 162 over a circuit that extends from ground $G^1$ through the ground springs 14 and 13 to the contact point 29 of the signaling device, thence through the spring 27 and springs 9 and 10 to the vertical line conductor 162. As a result the vertical line relay 62 of the repeater C receives the impulse and operates to ground the vertical trunk conductor 100 and to, therefore, operate the vertical line relay 109 of the repeater $C^1$ (Fig. 2). The vertical line relay 109 in turn grounds the vertical trunk conductor 133 and operates the vertical line relay 119 of the connector E. The operation of said relay, since the side switch wiper 127 is in third position, causes the operation of the ringer relay 131. The operating current flows from ground $G^{13}$ through the line relay springs 194 and 195 to the side switch wiper 127, contact point 226 to the ringer relay 131, thence through the springs 227 and 228 of the differential relay 193 to the battery lead 140, and through battery B to ground G. When the ringer relay spring 217 is pressed onto the spring 229 and the spring 230 onto the spring 231, thereby bridging the ringer generator 132 across the called subscriber's line, the ringer 222 of the substation #220 is rung over a line circuit that has already been pointed out. It will be noticed that when the side switch passes to third position the side switch wiper 126 of the connector E engages the grounded contact point 232, whereby a guarding potential is established at the private wiper 118 to protect the called line against interference after connection has been established. The circuit for the establishment of said guarding potential extends from ground $G^{14}$ to the contact point 232, thence through the side switch wiper 126 to the private wiper 118. The said guarding potential, furthermore, forces a current through the cut-off relay 233 of the line switch $A^1$, whereby the springs 234 and 235 are separated to disconnect the trip magnet 236 from the line, thus making it impossible for the ringing current to operate the line switch $A^1$ and cause an interference.

As explained, busy lines are protected by guarding potential, whether they are calling or whether they are called. In either case a guarding potential appears at the connector private banks. Assuming now that when the subscriber operates the rotary line relay 120 of the connector E for the last digit the desired line is busy, the connector side switch will be restored to normal position, and the connector switch shaft as well. In other words the connector-switch is released.

The busy release results as soon as the private magnet presses the springs 237 and 238 into contact. As a result a circuit is established through the release magnet 128, since at that time the private wiper 118 is in engagement with a grounded contact. The energizing circuit extends from said grounded contact to the private wiper 118, side switch wiper 126, contact point 213 (since the side switch is in second position) private springs 238 and 237 to the release magnet 128, thence through the springs 227 and 228 of the differential relay 193 to the battery lead 140, and through battery B to ground G. It will be clear of course, that the differential relay springs 227 and 228 are in engagement at the time, since the differential relay 193 energizes in series with the rotary line relay 120. When the release magnet 128 energizes, the connector-switch is, of course, restored to normal position and the switch-shaft also returns to normal position; and then when the subscriber presses his signaling button and operates the vertical line relay 119 of the connector E, since the connector is now in normal position, he operates the vertical magnet 121, raising the connector switch shaft. As a result the switch shaft springs 239 and 240 engage and close a circuit over which a busy signal is sent to the calling subscriber's station. The circuit for the said busy signaling current extends from the coil 241 of the busy machine K to the connector switch shaft springs 239 and 240, thence to the contact point 242, side switch wiper 125, ringer relay springs 217 and 216 to the condenser 130 of the connector E, trunk conductor 134, condenser 115 of the repeater $C^1$, vertical trunk conductor 185, vertical line wiper 88 of the selector D (Fig. 1), contact point 182, side switch wiper 96, vertical trunk conductor 100 to the condenser 68 of the repeater C, thence through the springs 42 and 43 of the line switch A to the rotary line conductor 135, through the primary winding 7 of the substation #500 to the vertical line conductor 162, thence through the springs 39 and 38 of the line switch A to the vertical line relay 62 of the repeater C, through the winding 69 of the differential relay 64 to the battery lead 140, then back to the coil 241 of the busy machine K. The calling subscriber upon hearing the busy signal restores his receiver to the switch-hook, and as a result the switching apparatus that he has brought into use is released.

The release occurs when the release springs 30, 31 and 32 are brought into contact. The vertical and rotary line conductors 162 and 135 are thus grounded simultaneously at the substation ground $G^1$. The vertical and rotary line relays 62 and 63 of the repeater C are thus energized simultaneously. The energizing circuit for the former is established from ground $G^1$ to the release spring 30, thence through the release springs 31 and 32 to the vertical line conductor 162 and through the vertical line relay 62 and winding 69 of the differential relay 64 to the battery lead 140, thence through battery B to ground G. The energizing circuit for the latter extends from ground $G^1$ to the release spring 30, thence to the release spring 31 and to the rotary line conductor 135, through the springs 43 and 42 of the line switch A, rotary line relay 63, winding 70 of the differential relay 64, pole changing relay springs 174 and 175 to the battery lead 140, thence through battery B to ground G. Not only do the line relays 62 and 63 energize, but the differential relay 64 energizes also, since the windings 69 and 70 receive current in multiple. Therefore the differential relay springs 243 and 244 are in contact at the same time that the line relays 62 and 63 press the trunk release springs 245 and 246 into engagement. A release circuit is thus established for the release magnet 37 of the line switch A that extends from ground $G^{15}$ through the differential relay springs 244 and 243, trunk release springs 246 and 245 and springs 44 and 45 of the line switch A to the release magnet 37, thence to the battery lead 140, and through battery B to ground G. The release magnet 37 then attracts its armature 50 (Fig. 3), thrusting the armature 52 of the trip magnet 36 over the end of the plunger-arm 47. At the same time the establishment of the said release circuit produces a deënergization of the auxiliary relay 66 of the repeater C through ground between the ground terminals $G^2$ and $G^{15}$ (Fig. 1). It will be noticed that since the spring 44 of the line switch A is connected to ground during the establishment of this release circuit, the contact 141 of the master switch bank is also connected to ground. If it should happen that while the said contact is grounded the master switch wiper 61 passes onto the said grounded contact 141, the differential relay 59 will be energized the same as if the said contact point were connected to main battery, the only difference being that the energizing circuit for said differential relay instead of extending through the winding 152 to ground $G^5$, as previously described, extends through the winding 247 as follows: From ground $G^{15}$ at the repeater C and through the trunk release springs 246 and 245 to the spring 44, thence to the contact point 141, master switch wiper 61 to the common member 149 of the master switch bank J, thence through the auxiliary relay 58 and winding 247 of the differential relay 59 to the battery lead 140, and through battery B to ground G. The energizing of the differential relay 59 of course, causes the energization of the motor magnet 57 for operating the plunger-shaft 56, as already explained. Furthermore, the simultaneous energization of the relays 62 and 63 grounds the vertical and rotary trunk conductors 100 and 101 simultaneously, whereby the vertical and rotary line relays 109 and 110 and the differential relay 111 are energized at the same time. Therefore, the trunk release springs 249 and 250 are brought into engagement at the same time that the differential relay springs 251 and 252 are brought into engagement. The release circuit is thus established through the back release relay 180 of the first-selector D over the trunk release conductor 253. The circuit is as follows: From ground $G^{11}$ at the first-selector D to the contact point 181, thence to the side switch wiper 98, back release relay 180, private wiper 90, trunk release conductor 253, trunk release springs 249 and 250, resistance coil 254, differential relay springs 252 and 251 to the battery lead 140, thence through battery B to ground G. The said back release relay, therefore, energizes, pressing the springs 255 and 256 into contact, and thus energizing the release magnet 257. The said release magnet 257 then attracts its armature and is thus in readiness to release the selector-switch D when the subscriber's release springs separate. Not only does the repeater $C^1$ thus energize the release magnet of the selector D, but causes a simultaneous grounding of the trunk conductors 133 and 134 in a well known manner whereby the vertical and rotary line relays 119 and 120 of the connector E are energized at the same time and with the differential relay 193. As a result the trunk release springs 258 and 259 are brought into contact while the differential relay springs 228 and 227 are in contact. The result is that the release magnet 128 is energized by a flow of current from ground $G^{13}$ through the trunk release springs 258 and 259 to the said release magnet 128, thence through said magnet and through the springs 227 and 228 to the battery lead 140, and through battery B to ground G. The release magnet of the connector upon energizing releases the switch-shaft of the connector. The foregoing all occurs while the release springs 31 and 32 are in engagement, but as soon as the said springs separate the line relays 62 and 63 of the repeater C as well as the differential relay 64 of said repeater deënergize, whereby the energizing circuit for the release magnet 37 of the line switch A is destroyed, at which instant the said line switch A is restored to normal condition. Also, the ground connection to the trunk conductors 100 and 101 is interrupted, so that the line relays 109 and 110 and the differential relay 111 of the repeater $C^1$ also deënergize. The deënergization of said relays produce the deënergization of the back release relay 180 of the selector D and of the release magnet 257, whereby the first selector is restored to normal condition and furthermore the ground connection to the trunk conductors 133 and 134 is broken. As a result the line relays 119 and 120 and the differential relay 193 of the connector E deënergize, permitting the release magnet 128 of said connector to deënergize also. All the switching apparatus is thus restored to normal condition. In case the subscriber at the substation #220 does not answer after connection is made, as described, the release of the switching apparatus occurs in the same manner. Furthermore, as soon as the connector wipers 116′, 117 and 118 break connection with the bank contacts the energizing circuit through the cut-off relay 233 of the line switch $A^1$ is broken, so that the said line switch $A^1$ is left in its normal condition.

The called subscriber answers (after connection is made with his line, when the connector side switch passes to third position, as already described), by removing his receiver 259′ from the switch-hook, thus causing the primary circuit springs 260 and 261 to close the primary circuit and break the ringing circuit by permitting the ringer springs 220 and 221 to separate. The primary circuit comprises the windings 262 and 263 of the back bridge relay 264, and when the subscriber's switch-hook goes up the said relay 264 energizes and the transmitter 265 of the substation #220 is provided with battery for talking. The circuit over which the said talking current flows extends from ground $G^{14}$ at the connector to the contact point 232, thence to the side switch wiper 126, winding 263 of the back bridge relay 264, ringer relay springs 216 and 217, side-switch wiper 125, contact point 215, rotary line wiper 117 to the rotary line conductor 219, thence through the primary winding 266 of the induction-coil 267, transmitter 265, primary circuit springs 260 and 261 to the vertical line conductor 224, thence to the vertical line wiper 116′, contact point 214, side switch wiper 124, winding 262 of the back-bridge relay 264, differential relay springs 268 and 228 to the battery lead 140, and through battery B to ground G. As soon as the back-bridge relay 264 energizes the springs 269 and 209 are pressed into contact, and as a result the pole changing relay 114 of the repeater $C^1$ is energized. The energizing current flows from ground $G^{14}$ to the side switch wiper 126, thence to the back-bridge relay springs 269 and 209 to the winding 208 of the differential relay 193, thence through the rotary line relay 120, rotary trunk conductor 134 to the pole changing relay 114 of the repeater $C^1$, thence through the differential relay springs 200 and 199 to the vertical trunk conductor 133, through the vertical line relay 119, winding 192 of the differential relay 193 to the battery lead 140, thence through battery B to ground G. Of course, the pole changing relay 114 of the repeater $C^1$ and the line relays 119 and 120 of the connector E energize in series, and the line relay springs 195, 194 and 211 are pressed into contact but with no result, since the energizing circuit for the ringer relay 131 is broken between the differential relay springs 228 and 227, and the private magnet 123 is short-circuited through ground between the grounds $G^{13}$ and $G^{14}$ due to the engagement of the back-bridge relay springs 269 and 209. The pole changing relay 114 of the repeater $C^1$ energizes to separate the spring 202 from the spring 203 and, therefore, from the non-grounded terminal of battery B, and engages instead the grounded spring 188. Also, the spring 189 is separated from the ground spring 188 to break the connection between ground and the line relay spring 186, and the spring 206 is separated from the spring 207 to prevent the establishment of a short-circuit between the rotary and vertical trunk conductors 133 and 134 when the line relays 109 and 110 of the repeater $C^1$ are energized. The shifting of the spring 202 into engagement with the ground spring 188 at the repeater $C^1$ established an energizing circuit for the pole changing relay 65 of the repeater C in series with the line relays 109 and 110 of the repeater $C^1$. The energizing circuit receives current from ground $G^{12}$ through the springs 188 and 202, winding 113 of the differential relay 111, rotary line relay 110 to the rotary trunk conductor 201, rotary line wiper 89, side switch wiper 97, switch shaft springs 104 and 102, rotary trunk conductor 101, conductor 146, auxiliary relay springs 143 and 144, differential relay springs 147 and 148 pole changing relay 65, vertical trunk conductor 100, side switch wiper 96, contact point 182, vertical line wiper 88, vertical trunk conductor 185, vertical line relay 109 of the repeater $C^1$, winding 112 of the differential relay 111 to the battery lead 140, thence through battery B to ground G. The energizing of the line relays 109 and 110, since the pole changing relay 114 is energized, produces no effect; but the energization of the pole changing relay 65 at the repeater C supplies the calling subscriber with talking battery current when the pole changing relay spring 174 leaves the spring 175 and engages the ground spring 270. A circuit is therefore established through the line relays 62 and 63 of the repeater C and the transmitter 8 of the substation #500. The current flows from the ground $G^{16}$ through the springs 270 and 174, winding 70 of the differential relay 64, rotary line relay 63, springs 42 and 43 of the line switch A, rotary line conductor 135, primary winding 7 of the induction-coil 6, transmitter 8, primary circuit springs 9 and 10 to the vertical line conductor 162, thence through the springs 39 and 38, vertical line relay 62 of the repeater C, through the winding 69 of the differential relay 64 to the battery lead 140, and through battery B to ground G. The line relays 62 and 63 are energized during the flow of said current and while the line relay springs 163, 164 and 176 are in contact; but since the pole changing relay 65 is energized, and since the springs 166 and 167 are separated, and as the springs 271 and 272 are also separated, the energization of said relays produces no effect. It will be noticed that both in the repeater C and the repeater $C^1$ the trunk release springs 245 and 246 in the former and 249 and 250 in the latter are in contact, since the line relays are energized; but the release circuits are not established because the differential relays 64 and 111 are not magnetized and, therefore, their respective release circuit springs 243 and 244 and 251 and 252 are separated. The calling and called subscribers being thus provided with talking battery current they communicate with each other over circuits already described and in a well known manner. After the two subscribers are through talking the calling subscriber may release the switching apparatus by hanging up his receiver and thus grounding (as already explained) the vertical and rotary line conductors 162 and 135. As a result the vertical line relay 62 of the repeater C is maintained energized, but the rotary line relay 63 together with the winding 70 of the differential relay 64 are short-circuited through ground for a moment between the ground points $G^{16}$ at the repeater C and $G^1$ at the substation. The short-circuiting path extends from ground $G^{16}$ through the pole changing relay springs 270 and 174, thence through the winding 70 of the differential relay 64, and rotary line relay 63 to the rotary line conductor 135, thence through the release springs 31 and 30 to the ground $G^1$. As a result the differential relay 64 becomes unbalanced and energizes, separating the springs 147 and 148 that control the energizing circuit through the pole changing relay 65, and brings into contact the release circuit springs 243 and 244. There results, therefore, first, the deënergization of the pole changing relay 65 of the repeater C. As soon as the pole changing relay 65 deënergizes the spring 174 returns to engagement with the spring 175, and the springs 166 and 167 and the springs 272 and 271 reëngage, thus restoring the connections between the line relay springs 163 and 176 and the vertical and rotary trunk conductors 100 and 101. When the pole changing relay spring 174 reëngages with the spring 175 the rotary line relay 63 is reënergized by a flow of current in the reverse direction, which current also flows through the winding 70 of the pole changing relay 64, further strengthening the magnetizing force of said relay. The result is that the vertical and rotary line relays 62 and 63 energize simultaneously, grounding the vertical and rotary trunk conductors 100 and 101, and closing the trunk release circuit through the release magnet 37 of the line switch A at the instant that the trunk release springs 245 and 246 of the repeater C come into contact. Previous to this, however and as soon as the pole changing relay is deënergized, the line relays 109 and 110 of the repeater $C^1$ also deënergize, since they are in the same circuit with the said pole changing relay. Therefore, grounding the vertical and rotary trunk conductors 100 and 101 causes, as in the repeater C, the energization of the vertical line relay 109 and the short-circuiting of the rotary line relay 110 in series with the winding 113 of the differential relay 111, as the pole changing relay 114 is still energized. The short-circuit exists between the ground point $G^{12}$ at the repeater $C^1$ and the ground point $G^8$ at the repeater C. The path of said short-circuit reaches from ground $G^{12}$ through the springs 188 and 202, through the winding 113 of the pole changing relay 111 and the rotary line relay 110 to the rotary trunk conductor 201, thence to the rotary trunk conductor 101 and through the pole changing relay springs 271 and 272, and through the line relay springs 176 and 164 to ground $G^8$. Therefore, the differential relay 111 at the repeater $C^1$ becomes energized for the same reason described in connection with the differential relay of the repeater C, and as a result the pole changing relay 114 is deënergized, since the springs 200 and 199 of the differential relay are separated. At the same time the differential relay springs 251 and 252 come into contact, partly completing the trunk release circuit. The deënergization of the pole changing relay restores the pole changing relay springs, whereby the ground connection is restored to the line relay ground spring 186, and the circuit is closed between the line relay spring 204 and the rotary trunk conductor 134. Furthermore, at the instant that the pole changing relay springs 202 and 203 reëngage, the rotary line relay 110 is reënergized, and since the current passes through the winding 113 of the differential relay 111 in a direction to augment the flow of current in the winding 112, said differential relay remains energized for the time being. Therefore, since by the simultaneous energization of the line relays 109 and 110 the trunk release springs 249 and 250 are brought into contact, the trunk release circuit is established through the back-release relay 180 of the first-selector D, and the said line relays cause the simultaneous grounding of the vertical and rotary trunk conductors 133 and 134. Previous to the grounding of said trunk conductors, however, the line relays 119 and 120 of the connector E are deënergized together with the pole changing relay 114 of the repeater $C^1$, since all of said relays are in series. The succeeding ground to the said trunk conductors 133 and 134, therefore, produces a reëenergization of the vertical line relay 119 and an energization of the differential relay 193, since at the same time the rotary line relay 120 and the differential relay winding 208 are short-circuited through ground between the ground points $G^{14}$ at the connector E and $G^{12}$ at the repeater $C^1$. The path of the short-circuit is as follows: From ground $G^{14}$ at the connector E to the side switch wiper 126, thence through the back-bridge relay springs 269 and 209 to the differential relay winding 208, rotary line relay 120 to the rotary trunk conductor 134, thence through the pole changing relay springs 206 and 207, line relay springs 204 and 186, pole changing relay springs 189 and 188 to ground $G^{12}$. The result of the energization of the differential relay 193 of the connector E is that the differential relay springs 268 and 228 are separated, whereby the back-bridge relay 264 is deënergized and the differential relay spring 228 is carried into engagement with the spring 227, closing a connection between the release magnet 128 and the said spring 228. The deënergization of the back-bridge relay 264 restores the spring 209 into engagement with the spring 210 and, therefore, with the battery lead 140, whereby the rotary line relay 120 is energized. The result is that the trunk release springs 258 and 259 are brought into engagement and the energizing circuit for the release magnet 128 completed from ground $G^{13}$ through the said trunk release springs and through the differential relay springs 227 and 228 to the battery lead 140, and through battery B to ground G. Therefore, the connector-switch and switch-shaft are restored, the latter causing the wipers 116′, 117 and 118 to return to normal position, breaking the energizing circuit for the cut-off relay 233 between the ground terminal $G^{14}$, private wiper 118 and the said cut-off relay 233. The line switch $A^1$, therefore, of the called line is thus restored to the control of the substation #220. As soon as the subscriber's release springs 30, 31 and 32 disengage, the ground connection to the subscriber's line conductors 162 and 135 is broken, and as a result the switching apparatus returns to normal position in the same manner described in the case of the release after the subscriber gets a busy signal or before the called subscriber answers. Sometimes it may happen that by accident the line switch A is operated so that the plunger 46 (Fig. 3) is tripped onto the bank. In such case the auxiliary relay 66 of the repeater C is energized and as a result the springs 143 and 144, as already explained, come into contact and energize the supervisory relay 103 of the selector D, the latter causing the supervisory lamp 107 to light and remain so. The attendant at the main trunking station on noticing the trouble-light at once knows which trunk is the one that has thus become occupied, since each trunk line has a separate selector D. Assuming, for example, that the trunk line terminating in the selector D is the eighth trunk leading from the line switch bank I, contrary to what has been assumed in the preceding the attendant will operate the auxiliary release switch H by pressing the rotary button 84 eight times, energizing each time the rotary magnet 75 over a circuit from ground $G^{17}$ through the springs 87 and 86, trunk conductor 273 to the said rotary magnet 75, thence over the conductor 274 to the battery lead 140, thence through battery B to ground G. The said rotary magnet then attracts its armature and causes the pawl 76 to engage the longitudinal teeth 72 of the shaft 71 each time it energizes and rotates the wiper 73 onto the eighth contact. He then presses the release button 83 and operates the release magnet 77. The energizing circuit extends from ground $G^{17}$ through the springs 87 and 85 to the trunk conductor 275, thence through the release magnet 77, conductor 274 to the battery lead 140, and through battery B to ground G. The release magnet 77 then presses the springs 80 and 81 into contact, sending a ground impulse through the release magnet 37 of the line switch A from ground $G^{18}$ through the springs 80 and 81 to the wiper 73, thence over the conductor 276, line switch springs 44 and 45 to the release magnet 37, thence to the battery lead 140, and through battery B to ground G, with the result that the line switch A is restored. At the same time that the release magnet 77 operates the said springs 80 and 81 the dog 78 is withdrawn from the longitudinal teeth 72, whereby the retracting spring 79 may restore the shaft 71 and wiper 73 to normal position.

The resistance of the various coils may be of any suitable character, but good results are obtained in the repeaters C and $C^1$ when the line relays 62 and 63 and 109 and 110 are wound to a resistance of one hundred ohms each; the windings of the differential relays 64 and 111 to two hundred and fifty ohms each; the pole changing relays 65 and 114 to five hundred ohms each; the auxiliary relay 66 of the repeater C to fifty five hundred ohms; and in the release switch H the rotary and the release magnets 75 and 77 to one hundred ohms each.

From the foregoing it will be seen that it is not necessary to send a "trouble man" to the sub-central stations to restore any subscriber's individual switches which may have been operated by accidental and temporary grounding on the corresponding subscriber's lines. The attendant at the main or central trunking station can constantly observe the condition of the individual switches at the sub-central or outlying stations, and when one is found off normal as the result of an accidental and temporary grounding of the subscriber's line, the attendant can then select the trunk line which is thus temporarily tied up and put out of service, and may then cause the off-normal individual switch to disconnect from the said trunk line, restoring the latter to its normally idle condition. In each case the automatic restoration is accomplished from the main or central station, and by simply putting a ground on the trunk release circuit of the off-normal switch, the release, of course, being always initiated over the release trunk running from the central station to the sub-central station at which the off-normal switch is located. I do not, however, limit myself to this exact construction and arrangement, as broadly considered my invention is of course, applicable to different methods of releasing automatic switches. Preferably, however, I employ my central station supervisory releasing or restoring apparatus in combination with trunk release circuits extending between automatic switches, or between automatic switches and repeaters.

What I claim as my invention is:—

1. In a telephone exchange system, the combination of subscribers' lines terminating at a sub-central station, individual switches for the subscribers' lines at the sub-central station, one or more of which are off-normal, trunk lines leading from the sub-central station to a main or central trunking station, means for temporarily grounding any calling subscriber's line to cause the corresponding individual switch to automatically select a non-busy trunk line, a special release trunk running from the main or central station to the sub-central station, means for transmitting electrical impulses over said release trunk, means at the sub-central station for receiving said electrical impulses and thereby selecting any busy trunk line, and means by which the selection of such trunk line automatically effects the restoration of the off-normal switch.

2. In a telephone exchange system, the combination of a main or central trunking station, sub-central or outlying trunking stations, trunk lines connecting the main or central station with the sub-central stations, subscribers' telephone lines terminating at said sub-central stations, automatic switching machinery at the sub-central stations, a special release trunk for each sub-central station, said release trunks extending from the main or central station to the sub-central stations, means at the main or central station by which an attendant may transmit electrical impulses over said release trunks, means at the sub-central stations for receiving said electrical impulses and thereby selecting any busy trunk line, and means by which such selection of a busy trunk line effects the automatic release of the same from the subscriber's line by which it is made busy.

3. In a telephone exchange system, the combination of a main or central trunking station, sub-central or outlying trunking stations, trunk lines connecting the main or central station, with the said sub-central stations, subscribers' telephone lines terminating at the sub-central stations, automatic trunking machinery located at the sub-central stations and by which calling telephone lines are automatically placed in connection with non-busy trunk lines, a special releasing switch for each sub-central station, said releasing switches adapted to select any trunk line, release trunks extending from the main or central station to the said releasing switches at the sub-central stations, means by which an attendant at the central station may transmit electrical impulses over said releasing trunks to control the operations of said releasing switches, and means by which the selection of a busy trunk line by a releasing switch automatically effects a disconnection of the same from the subscriber's line by which it is made busy.

4. In a telephone exchange system, the combination of subscribers' telephone lines, individual switches for said telephone lines, trunk lines to be selected by said individual switches, a special releasing switch common to all of said individual switches, means by which an attendant may cause said releasing switch to select any particular trunk-line which is busy, and means by which such selection of a trunk line automatically effects a restoration of the corresponding off-normal individual switch.

5. In a telephone exchange system, the combination of subscribers' telephone lines, individual trunking switches for said telephone lines, trunk lines to be connected by the switches, with the telephone lines, a trunk release circuit for each individual switch, a selective switch provided with means for putting a ground on any one of said trunk release circuits to release or restore the corresponding off-normal individual switch, a release trunk running to said selective switch, and means for transmitting electrical impulses over said release trunk to control the selective and releasing operations of said selective switch.

6. In a telephone exchange system, the combination of a main or central trunking station, sub-central or outlying trunking stations, trunk lines connecting the main or central station with the sub-central stations, subscribers' telephone lines terminating at the sub-central stations, subscribers' individual trunking switches at the sub-central stations, repeaters at the sub-central stations, connectors at the sub-central stations, repeaters at the main or central station, selective trunking switches at the main or central station, impulse transmitters at the subscribers' stations, the repeaters at the sub-central stations being adapted to repeat to the main or central station any electrical impulses received from a calling subscriber's station, and the repeaters at the main or central station, being adapted to repeat to a called sub-central station any electrical impulses received from the calling sub-central station, a special releasing switch at each sub-central station, said releasing switches provided with means for selecting any busy trunk lines, and thereby releasing the corresponding off-normal individual switches, release trunks extending from the main or central station to the said releasing switches, and means at the main or central station for enabling an attendant to control the selective and releasing operations of said releasing switches.

7. In a telephone exchange system, the combination of subscribers' telephone lines, an individual switch for each telephone line, trunk lines to be selected by said individual switches, said trunk lines less in number than said telephone lines, an associated selective switch provided with means for selecting any one of said trunk lines, having a bank of contacts corresponding in number to the said trunk lines, a wiper adapted to travel over said contacts to select the one corresponding to a busy trunk line, a suitable connection between said trunk lines and their respective contacts in said bank means for first grounding the said wiper and then instantly releasing it from engagement with any selected contact, and means by which the grounding of said wiper automatically effects a release of the off-normal individual switch by which the trunk line corresponding to the selected contact is made busy.

8. In a telephone exchange system, the combination of individual switches, an associated releasing switch provided with means for selecting and causing the release of any off-normal individual switch, and means for effecting the selecting and releasing operations of said associated switch.

9. In a telephone exchange system, the combination of a plurality of repeaters, automatic switching machinery for selecting non-busy repeaters, an associated releasing switch provided with means for selecting and causing the release of any off-normal or busy repeater, and means for controlling the selective and releasing operations of said associated switch.

10. In a telephone exchange system, the combination of a plurality of trunk lines means for establishing connections with the said trunk lines, an associated auxiliary switch provided with means for selecting and causing the release or disconnection of any busy trunk line, and means for controlling the selective and releasing operations of any automatic auxiliary switch.

11. In a telephone exchange system, the combination of a talking circuit including a trunk line, a supervisory lamp at one end of said trunk line, a supervisory relay associated with said lamp, a circuit through the said lamp controlled by the said relay, another supervisory relay at the other end of said trunk line, an energizing circuit including a portion of the talking circuit for said first-mentioned relay controlled by said last-mentioned relay, and an automatic switch for selecting said trunk.

12. In a telephone exchange system, the combination of a trunk line, repeating relays at one end of said trunk line, a selector at the other end of said trunk line, a supervisory or off-normal lamp for said selector, a supervisory or off-normal relay for said selector, a local circuit for said lamp, controlled by said off-normal or supervisory relay, another supervisory or off-normal relay associated with said repeating relays, and an energizing circuit for said first-mentioned supervisory relay controlled by said last-mentioned supervisory relay.

13. In a telephone exchange system, the combination of a trunk line, repeating relays at one end of said trunk line, a selector at the other end of said trunk line, a supervisory or off-normal lamp for said selector, a supervisory or off-normal relay for said selector, a local circuit for said lamp, controlled by said off-normal or supervisory relay, another supervisory or off-normal relay associated with said repeating relays and an energizing circuit for said first-mentioned supervisory relay controlled by said last-mentioned supervisory relay, said energizing circuit including both sides of the trunk line.

14. In a telephone exchange system, a talking circuit, an automatic selector provided with a supervisory or off-normal lamp, a local circuit for said lamp, an off-normal or supervisory relay for said selector, said relay controlling the circuit of said lamp, and an energizing circuit including a portion of the talking circuit for said relay.

15. In a telephone exchange system, a repeater provided with repeating relays, a line over which electrical impulses are repeated by said relays, a supervisory signal device at the other end of said line, a supervisory relay associated with said repeating relays, and an operating circuit for said supervisory signal device controlled by said supervisory relay.

16. In a telephone exchange system, the combination of a subscribers' telephone line, automatic switches having vertical and rotary motion by which the subscriber connects his telephone line with some other line, operating relays therefor, a battery for operating said switches, said battery having one pole grounded and the other pole normally connected with one side of said telephone line, the other side of said telephone line being normally insulated or disconnected from both the ground and said battery, and means operated upon the vertical movement of said switch for connecting said other side of the line with the non-grounded pole of the battery through one of said relays in the operation of one of said switches.

17. In a telephone exchange system, the combination of a plurality of automatic switches, a trunk release circuit for each automatic switch, subscriber-controlled means for putting a ground on the trunk release circuit of any busy switch to restore the latter, an auxiliary switch provided with means for selecting and putting a ground on the trunk release circuit of any busy switch, and means for controlling the selective and grounding operations of said auxiliary switch.

18. In a telephone exchange system, an automatic selector-switch provided with first and second supervisory or off-normal lamps, a circuit for lighting the first lamp during the initial operation of the selector-switch, and a circuit for lighting the second lamp after the selector-switch is through operating.

19. In a telephone exchange system, a line, a repeater on said line, said repeater provided with line and pole-changing relays, a battery having one pole normally connected with the line relays, adapted to be switched into series with and between the line relays by the energizing of the pole-changing relay, a ground connection, and connections by which the energizing of the line relays connects the line with said ground connection, said pole-changing relay provided with normally closed contacts controlling the electrical connection between the line and the said ground connection.

20. In a telephone exchange system, the combination of a subscriber's telephone, a subscriber's telephone line, means for furnishing talking current over the telephone line to the subscriber's telephone, a repeater, a trunk line leading from said repeater, a switching machine at the end of said trunk line, and means by which the subscriber uses the repeater for controlling the said switching machine, said repeater provided with a pair of line relays having a spring or contact permanently connected to ground.

21. In a telephone exchange system, a repeater having vertical and rotary line conductors, a battery normally connected with both line conductors, and a pole changing relay for said repeater, said pole-changing relay adapted when energized to shift the rotary line conductor from the non-grounded to the grounded pole of said battery.

22. In a telephone exchange system, a repeater, vertical and rotary line conductors therefor, a pole-changing relay, a battery having one pole grounded and the other pole normally connected with both line conductors, said pole-changing relay adapted when energized to shift the rotary line conductor from the grounded to the non-grounded pole of the battery, a trunk release circuit, and a differential relay, said trunk release circuit being controlled by both the differential relay and the pole-changing relay.

23. In a telephone exchange system, a central station, a sub-central station, two-wire trunks connecting the two stations, subscribers' individual switches at the sub-central station for automatically selecting said trunks, one or more of which are off-normal, and means for enabling a central station, attendant to release any off-normal switch.

24. In a telephone exchange system, a central station, a sub-central station, two-wire trunks connecting the two stations, automatic switches controlled by the subscribers for automatically selecting trunks at the sub-central station, one or more of which are off-normal, and means under the control of a central station attendant for releasing any off-normal switch.

25. In a telephone exchange system, a central station, a sub-central station, two-wire trunks connecting the two stations, trunk-selecting switches controlled by the subscribers at the sub-central station a special releasing switch at the sub-central station, and means by which an attendant at the central station controls said releasing switch to release and restore any off-normal trunk-selecting switch.

26. In a telephone system, a central station, a sub-central station, two-wire trunks connecting the two stations, subscribers' automatic trunk selecting switches at the sub-central station, a special trunk selector at the sub-central station, a special release trunk connecting said special switch with the central station, and means by which an attendant at the central station controls said special release trunk for the purpose of finding and releasing any off-normal trunking switch.

27. In a telephone exchange system, the combination of a main or central trunking station, sub-central or outlying trunking stations, trunk lines connecting the main or central station with the sub-central stations, subscribers' telephone lines terminating at the sub-central stations, subscribers' individual trunking switches at the sub-central stations, repeaters at the sub-central stations, connectors at the sub-central stations, repeaters at the main or central station, selective trunking switches at the main or central station, impulse transmitters at the subscribers' stations, the repeaters at the sub-central stations being adapted to repeat to the main or central station any electrical impulses received from a calling subscriber's station, and the repeaters at the main or central station being adapted to repeat to a called sub-central station any electrical impulses received from the calling sub-central station, a special releasing switch at each sub-central station, said releasing switches provided with means for selecting any busy trunk lines and thereby releasing the corresponding off-normal individual switches, release trunks extending from the main or central station to the said releasing switches, and means at the main or central station for enabling an attendant to control the selective and releasing operations of said releasing switches, said connectors having one motion to select groups of subscribers and another motion to connect with the called line in any selected group.

28. In a telephone exchange system, the combination of a trunk line, repeating relays at one end of said trunk line, a selector at the other end of said trunk line, a supervisory or off-normal lamp for said selector, a supervisory or off-normal relay for said selector, a local circuit for said lamp, controlled by said off-normal or supervisory relay, another supervisory or off-normal relay associated with said repeating relays, and an energizing circuit for said first-mentioned supervisory relay controlled by said last-mentioned supervisory relay, said selector having one motion to select groups and another motion to connect with a line in any selected group.

29. In a telephone exchange system, an automatic selector provided with an off-normal lamp, a local circuit for said lamp, an off-normal or supervisory relay for said selector, said relay controlling the circuit of said lamp, and an energizing circuit including a portion of the talking circuit for said relay, said selector having one motion to select groups and another motion to connect with a line in any selected group.

30. In a telephone exchange system, an automatic selector-switch provided with first and second supervisory or off-normal lamps, a circuit for lighting the first lamp during the initial operation of the selector-switch, and a circuit for lighting the second lamp after the selector-switch is through operating said selector-switch having motion in one plane to select groups and motion in another plane to connect with a line in any selected group.

31. In a telephone system, automatic switches, means by which the subscribers may use said switches in calling, a switch selector, and means by which an attendant may use said switch selector for restoring said switches.

32. In a telephone exchange system, the combination of a first-selector, means for causing said selector to perform a trunking operation in accordance with the first digit of the called number, a visual signal for announcing the initial operation of said first-selector, and a separate visual signal associated with said first selector for announcing that the selector has completed its operation and is temporarily in an off-normal condition.

33. In a telephone exchange system, the combination of trunk lines, an automatic trunk-selecting switch, means for indicating the initial operation of said switch, and means associated with said switch for announcing the completion of the operation of the switch and the temporary seizure thereby of one of said trunk lines.

34. In a telephone exchange system, an electrically-propelled and step-by-step actuated switch provided with a plurality of visual signals for indicating its initial and final operations.

35. In a telephone exchange system, an automatic selector provided with an off-normal lamp, a local circuit for said lamp, an off-normal or supervisory relay for said selector, said relay controlling the circuit of said lamp, and an energizing circuit for said relay including a trunk connection.

36. In a telephone exchange system, an automatic selector provided with an off-normal lamp, a local circuit for said lamp, an off-normal or supervisory relay for said selector, said relay controlling the circuit of said lamp, an energizing circuit for said relay including a trunk connection, and common battery connector switches, together with electrically controlled means for supplying talking current through the said connector switches to the substations of called subscribers.

37. In a telephone exchange system, an automatic selector switch provided with first and second supervisory or off-normal lamps, a circuit for lighting the first lamp during the initial operation of the selector switch, a circuit for lighting the second lamp after the first selector switch is through operating, and common battery connector switches, together with electrically controlled means for supplying talking current through the said connector switches to the substations of called subscribers.

38. In a telephone exchange system, the combination of a first-selector, means for causing said selector to perform a trunking operation in accordance with the first digit of the called number, a visual signal for announcing the initial operation of said first-selector, a separate visual signal associated with said selector for announcing that the selector has completed its operation and is temporarily in an off-normal condition, and common battery connector switches, together with means for supplying talking current through the said connector switches to the substations of called subscribers.

39. In a telephone exchange system, the combination of trunk lines, an automatic trunk-selecting switch, means for indicating the initial operation of said switch, means associated with said switch for announcing the completion of the operation of the switch and the temporary seizure thereby of one of said trunk lines, and common battery connector switches, together with means for supplying talking current through the said connector switches to the substations of called subscribers.

40. In a telephone exchange system, an electrically-propelled and step-by-step-actuated switch provided with a plurality of visual signals for indicating its initial and final operations, and common battery connector switches, together with means for supplying talking current through the said connector switches to the substations of called subscribers.

41. In a telephone exchange system, the combination of a first-selector, electrically controlled means for causing said selector to perform a trunking operation in accordance with the first digit of the called number, a visual signal for announcing the initial operation of said first-selector, and a separate visual signal associated with said first selector for announcing that the selector has completed its operation and is temporarily in an off-normal condition.

42. In a telephone exchange system, the combination of trunk lines, an automatic trunk-selecting switch, electrically controlled means for indicating the initial operation of said switch, and electrically controlled means associated with said switch for announcing the completion of the operation of the switch and the temporary seizure thereby of one of said trunk lines.

Signed by me at Chicago, Cook county, Illinois, this 10 day of July, 1917.

TALBOT G. MARTIN.